United States Patent [19]
Ilves et al.

[11] Patent Number: 6,165,380
[45] Date of Patent: *Dec. 26, 2000

[54] METHOD FOR TRANSFERRING HEAT UTILIZING HEAT TRANSFER/COOLING FLUID HAVING TRI-METHYL GLYCINE

[75] Inventors: Antti Ilves; Matti Lindström, both of Lappeenranta, Finland

[73] Assignee: Neste OY, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 09/142,093

[22] PCT Filed: Feb. 27, 1997

[86] PCT No.: PCT/FI97/00131

§ 371 Date: Oct. 2, 1998

§ 102(e) Date: Oct. 2, 1998

[87] PCT Pub. No.: WO97/31988

PCT Pub. Date: Sep. 4, 1997

[30] Foreign Application Priority Data

Mar. 1, 1996 [FI] Finland ..................................... 960971

[51] Int. Cl.$^7$ ................................. C09K 5/00; C09K 3/18
[52] U.S. Cl. ................................. 252/77; 252/79; 252/73; 252/67; 252/70; 562/575
[58] Field of Search ................................. 252/77, 79, 73, 252/67, 70; 510/490; 562/575

[56] References Cited

U.S. PATENT DOCUMENTS

| | | | |
|---|---|---|---|
| 2,308,246 | 1/1943 | Polin et al. ................................. | 252/77 |
| 4,486,328 | 12/1984 | Knott et al. ................................. | 252/117 |
| 4,652,711 | 3/1987 | Hirsbrunner et al. ................... | 562/575 |
| 4,704,220 | 11/1987 | Goddard et al. ........................... | 252/75 |
| 5,156,773 | 10/1992 | Kochavi et al. ........................... | 252/547 |
| 5,292,942 | 3/1994 | Aigner et al. ........................... | 562/575 |
| 5,464,565 | 11/1995 | Hamann et al. ......................... | 252/546 |

FOREIGN PATENT DOCUMENTS

| | | | |
|---|---|---|---|
| 0369100 | 5/1990 | European Pat. Off. | C09K 5/00 |
| 0379175 | 7/1990 | European Pat. Off. | C09K 5/05 |
| 0641849 | 3/1995 | European Pat. Off. | C09K 5/00 |
| 1044843 | 11/1958 | Germany | C09K 5/04 |
| 8-81348 | 3/1996 | Japan . | |
| WO 87/03895 | 12/1985 | U.S.S.R. | C09K 5/00 |

OTHER PUBLICATIONS

Kennerley et al, "Optical Studies of the Soret Effect. Part IV.", J. Chem. Soc., pp. 607–611, 1968.

Chemical Abstracts, 68:81924, "Optical studies of the Soret effect", Kennerley et al, No month available 1968.

*Primary Examiner*—Necholus Ogden
*Attorney, Agent, or Firm*—Steinberg & Raskin, P.C.

[57] ABSTRACT

A heat transfer/cooling fluid for low temperatures containing from about 15% to about 70% of trimethyl glycine or derivatives thereof and from about 30% to about 85% of water. The heat transfer/cooling fluid is environmental-friendly and non-toxic. It has good heat transfer properties and is suitable for, e.g., the needs of the food industry and solar panels.

9 Claims, No Drawings

METHOD FOR TRANSFERRING HEAT UTILIZING HEAT TRANSFER/COOLING FLUID HAVING TRI-METHYL GLYCINE

FIELD OF THE INVENTION

The invention relates to a heat transfer/cooling fluid and method of using the same, the heat transfer/cooling fluid being suitable for a wide range of uses, especially for heat transfer uses presupposing environment-friendliness and health viewpoints, for example non-toxicity and a wide temperature range.

BACKGROUND OF THE INVENTION

Heat transfer/cooling fluids are commonly used in industry, technical installations in buildings, refrigeration equipment and motor applications.

Good heat transfer properties are important in heat transfer/cooling fluids. This presupposes a good specific thermal capacity, thermal conductivity and pumpability. A low viscosity value at low temperatures is typical of heat transfer fluids, because in such a case the fluid can be brought into a turbulent flow with a lower pump power.

In addition to the above properties, important properties of heat transfer fluids often also include environment-friendliness and non-toxicity, in particular when used in the food industry and in the heating of household water. The heat transfer fluid must not be in any way harmful to the products being processed. Slight leakages of the fluid into the process could cause severe accidents. Therefore non-toxicity of the fluid is one of the most crucial factors.

The most typical fluids are organic and water-containing heat transfer/cooling fluids. The problem with organic fluids is the difficulty in their use and their toxicity. With respect to most of its properties, water is a nearly perfect heat exchange fluid. It has good heat transfer and pumpability properties. In addition, water is completely non-toxic and non-hazardous to the environment. In addition, it is in no was flammable. Indeed, the major disadvantage of water is the narrow temperature range for its use. As is known, water freezes at 0° C. and boils at 100° C. Furthermore, water causes corrosion, especially in connection with iron-containing materials.

As to the state of the art regarding heat transfer fluids used at low temperatures, reference can be made to, for example, EP application publication 0641849, which discloses a heat transfer fluid composition comprising an alkylmethylsiloxane fluid or a combination of alkylmethylsiloxane fluids and various fluids based on polydiorganosiloxane with terminal trimethylsilyl groups.

The most typical water-based heat transfer fluids are aqueous mixtures of ethylene glycol, propylene glycol and ethanol. Ethylene glycol is one of the best known heat transfer fluids, and it is used in particular in the automobile industry. However, the use of ethylene glycol has disadvantages in that the substance is toxic and is not very environment-friendly. Propylene glycol is indeed often used instead of ethylene glycol in applications in which less toxic properties are required. Although propylene glycol is relatively non-toxic, it is, nevertheless, a substance which pollutes the environment. One disadvantage of propylene glycol is the great increase in its viscosity at low temperatures; this increases the required pump power.

The non-toxicity of ethanol as compared with ethylene glycol is an advantage in its use, but its use has the disadvantage in its great volatility and consequently in its constituting a fire hazard and great increase in its viscosity at low temperatures, the latter being, however, more advantageous than with propylene glycols. For this reason ethanol is a commonly used substance as a heat transfer fluid in laboratories and in conditions requiring non-toxicity. However, the use of ethanol involves the problem that it requires permits from the health authorities, a factor which complicates the use of this fluid.

Corrosion, in particular in the case of glycols, has forced users to seek expensive and effective corrosion inhibitors. The monitoring of the composition and concentration of corrosion inhibitors is difficult. In general, an effective inhibitor makes an otherwise highly non-toxic liquid toxic. Typically complicated solutions increase the cost of the end solution.

As regards the state of the art associated with corrosion inhibitors, reference can be made to EP application publication 0369100, which discloses a heat transfer fluid which contains a dicarboxylic acid mixture as a corrosion inhibitor and in which the cooling fluid composition comprises a water-soluble liquid alcohol to lower the freezing point; for example ethylene glycol and a mixture of glycol and diethylene glycol have been used in that capacity.

OBJECTS AND SUMMARY OF THE INVENTION

The goal of the present invention is to provide a heat transfer/cooling fluid in which the problems and disadvantages of state-of-the-art options have been eliminated, or at least substantially minimized.

It is an object of the invention to provide a heat transfer/cooling fluid which is suitable for use at low temperatures and which is safe in terms of health and the environment and technically economical to use.

The heat transfer/cooling fluid according to the invention is primarily characterized in that it contains trimethyl glycine or a derivative thereof from about 15% to about 70% and water from about 30% to about 85%. The most typical cooling fluid according to the invention contains trimethyl glycine 35%.

A preferred compound for use as a component in the heat transfer fluid is trimethyl glycine or salts of trimethyl glycine hydrate. An especially preferred compound is trimethyl glycine, i.e. betaine. The latter can be prepared by isolating it from natural products, e.g. sugar beet; this enables a heat transfer fluid of a biologic origin, having an advantageous life cycle, to be prepared.

The heat transfer/cooling fluid according to the invention has the advantages of non-toxicity and simplicity. Its physical properties are the same as those of glycol solutions. The heat transfer/cooling fluid according to the invention is suitable for use at temperatures of from about −50 to about +100° C. A preferred temperature range in heat pumps and in refrigeration equipment is from about −40 to about +70° C. Furthermore, a heat transfer/cooling fluid according to the invention withstands boiling, which occasionally occurs in solar panels.

Together with the heat transfer/cooling fluid according to the invention it is possible to use conventional corrosion inhibitors, stabilizing agents and marking agents, necessary at a given time, which are well known in the art.

The heat transfer/cooling fluid according to the invention is less toxic and more environment-friendly than known cooling fluids. It is not classified as a problem waste, and its easy destruction decreases the costs. The handling of the waste of a heat transfer fluid according to the invention does not require special measures; it can be absorbed into soil or be run into a drain, whereas the ethylene and propylene glycols and ethanol used in state-of-the-art options have to be treated either at a problem waste treatment plant or under the supervision of public authorities.

The heat transfer/cooling fluid according to the invention is suitable for use in various applications, especially in those in which the temperatures are low and which require the fluid to be environment-friendly and non-toxic, for example in the food industry. Some applications which can be mentioned include solar heat systems, heat pumps, refrigeration equipment, ventilation and air-conditioning equipment, in which in particular heat or cold is recovered from the exit air and is transferred to the inlet air. One application which can be mentioned is solar panels.

DETAILED DESCRIPTION OF THE INVENTION

EXAMPLE 1

The toxicity of the fluids was assessed on the basis of $LD_{50}$ values obtained from the literature. The $LD_{50}$ values used have been tested orally on rats. The values are shown in Table I.

TABLE I

| Material | $LD_{50}$/mg/kg |
|---|---|
| Ethylene glycol | 4 700 |
| Propylene glycol | 20 000 |
| Ethanol | 7 060 |
| Trimethyl glycine | 11 179 |

EXAMPLE II

The viscosity values of fluids at the same concentrations are compared in Table II. Table III shows a comparison at a concentration corresponding to a freezing point of −15° C. The freezing point is the temperature at which the first crystals are formed in the solution.

TABLE II

| Fluid | Concentration wt % | Kinetic viscosity mm²/s | | | |
|---|---|---|---|---|---|
| Temperature | | 20° C. | 0° C. | −10° C. | −20° C. |
| Ethylene glycol | 50 | 3,48 | 7,40 | 11,7 | 19,6 |
| Propylene glycol | 50 | 6,44 | 18,70 | 38 | 87 |
| Ethanol | 50 | 3,10 | 7,22 | 12,20 | 23 |
| Trimethyl glycine | 50 | 5,90 | 12,80 | 21,50 | 38 |

TABLE III

| Fluid | Concentration wt % | Kinetic viscosity mm²/s | | | |
|---|---|---|---|---|---|
| Temperature | | 20° C. | 0° C. | −10° C. | −15° C. |
| Ethylene glycol | 30,5 | 2,1 | 4,3 | 6,5 | 8,2 |
| Propylene glycol | 33 | 3,3 | 7,8 | 14,4 | 20 |
| Ethanol | 24,5 | 2,5 | 5,9 | 10,9 | 15,8 |
| Trimethyl glycine | 35 | 2,1 | 5,1 | 11 | 17,2 |

EXAMPLE III

The lowering of the freezing point for various solutions at a concentration of 50 wt. % is shown in Table IV.

TABLE IV

| Fluid | Freezing point for a 50 wt. % solution / ° C. |
|---|---|
| Ethyl glycol | −35 |
| Propyl glycol | −34 |
| Ethanol | −38 |
| Trimethyl glycine | −43 |

The method according to the present invention comprises the steps of (1) generating the heat transfer/cooling fluid described herein and (2) adding such heat transfer/cooling fluid to a heat transfer fluid system.

The invention is described above with reference to only a few of its preferred examples; however, the purpose is not to limit the invention strictly to the details of the examples. Many modifications and variations are possible within the inventive idea defined in the following patent claims.

What is claimed is:

1. A method for transferring heat comprising the steps of:

generating a heat transfer/cooling fluid comprising from about 15% to about 70% of trimethyl glycine or salts of trimethyl glycine hydrate by weight and from about 30% to about 85% of water by weight;

adding said fluid to a heat transfer fluid system.

2. A method for transferring heat according to claim 1, wherein the heat transfer/cooling fluid contains salts of trimethyl glycine hydrate.

3. A method for transferring heat according to claim 1, wherein the heat transfer/cooling fluid contains trimethyl glycine.

4. A method for transferring heat according to claim 1, wherein the heat transfer/cooling fluid comprises from about 30% to about 50% trimethyl glycine and from about 50% to about 70% of water.

5. A method for transferring heat according to claim 1, wherein the heat transfer/cooling fluid contains approximately 35% of trimethyl glycine and approximately 65% of water.

6. A method for transferring heat according to claim 1, wherein the temperature range of use of the heat transfer/cooling liquid is from about −50 to about +100° C.

7. A method for transferring heat according to claim 1, wherein the temperature range of use of the heat transfer/cooling is from about −40 to about +70° C.

8. A method for transferring heat according to claim 1, wherein the heat transfer/cooling fluid contains trimethyl glycine of a biologic origin.

9. A method for transferring heat according to claim 1, wherein said heat transfer system is one of a solar based system, heat pump system, refrigeration equipment system, ventilation equipment system and air-conditioning equipment system.

* * * * *